US011898668B1

(12) United States Patent
Hsieh

(10) Patent No.: US 11,898,668 B1
(45) Date of Patent: Feb. 13, 2024

(54) JOINT ASSEMBLY FOR A HOSE ASSEMBLY

(71) Applicant: Yuan Pin Industrial Co., Ltd., Ho-Mei Township, Chang-Hua County (TW)

(72) Inventor: Ming-Chih Hsieh, Ho-Mei Township (TW)

(73) Assignee: Yuan Pin Industrial Co., Ltd., Ho-Mei Township (TW)

( * ) Notice: Subject to any disclaimer, the term of this patent is extended or adjusted under 35 U.S.C. 154(b) by 0 days.

(21) Appl. No.: 17/946,172

(22) Filed: Sep. 16, 2022

(51) Int. Cl.
*F16L 19/028* (2006.01)
*F16L 33/01* (2006.01)
*F16L 39/02* (2006.01)

(52) U.S. Cl.
CPC ............. *F16L 19/028* (2013.01); *F16L 33/01* (2013.01); *F16L 39/02* (2013.01)

(58) Field of Classification Search
CPC ......... F16L 33/01; F16L 33/20; F16L 33/213; F16L 33/24; F16L 33/223; F16L 39/02; F16L 37/56; F16L 37/565
See application file for complete search history.

(56) References Cited

U.S. PATENT DOCUMENTS

| | | | | | |
|---|---|---|---|---|---|
| 2,809,056 | A | * | 10/1957 | Kaiser | F16L 33/01 |
| 5,720,325 | A | * | 2/1998 | Grantham | F16L 39/02 |
| 6,106,027 | A | * | 8/2000 | Mulvey | F16L 33/01 |
| 2004/0244848 | A1 | * | 12/2004 | Maldavs | F16L 37/565 |
| 2009/0032164 | A1 | * | 2/2009 | Halimi | F16L 33/01 |
| 2019/0226615 | A1 | * | 7/2019 | Wu | F16L 33/01 |
| 2019/0242502 | A1 | * | 8/2019 | Pan | F16L 33/01 |

* cited by examiner

*Primary Examiner* — William S. Cho

(57) ABSTRACT

A joint assembly is connected to a hose assembly. The hose assembly includes a hose in a sleeve. The joint assembly includes an internal joint and an external joint. The internal joint includes an external thread, a shank at an end, and an annular ridge on the shank. The external joint includes an internal thread, a connective portion at an end, a shank at another end, and a conical internal face. The shank of the external joint is inserted in the sleeve. The external joint receives the hose. The shank of the internal joint is inserted in the hose. The external thread of the internal joint is engaged with the internal thread of the external joint to cause the annular ridge of the internal joint to press the hose against the conical internal face of the external joint.

9 Claims, 7 Drawing Sheets

JOINT ASSEMBLY FOR A HOSE ASSEMBLY

BACKGROUND OF INVENTION

1. Field of Invention

The present invention relates to hoses and, more particularly, to a joint assembly for a hose assembly.

2. Related Prior Art

There is a hose assembly includes a hose in a sleeve. The hose is made of an elastic material. Flux and hydraulic pressure increase the length and diameter of the hose. The sleeve is made of non-elastic material. The sleeve includes folds to allow the longitudinal extension of the hose.

A joint assembly is used to connect each end of the hose assembly to a faucet or a sprinkler. The joint assembly must be tightly connected to the hose and sleeve to stand the increasing of the length and diameter of the hose assembly lest the joint assembly might be detached from the hose assembly.

The present invention is therefore intended to obviate or at least alleviate the problems encountered in the prior art.

SUMMARY OF INVENTION

It is the primary objective of the present invention to provide a reliable joint assembly for a hose assembly that includes a hose in a sleeve.

To achieve the foregoing objective, the joint assembly includes an internal joint and an external joint. The internal joint includes an external thread, a shank at an end, and an annular ridge on the shank. The external joint includes an internal thread, a connective portion at an end, a shank at another end, and a conical internal face. The shank of the external joint is inserted in the sleeve. The external joint receives the hose. The shank of the internal joint is inserted in the hose. The external thread of the internal joint is engaged with the internal thread of the external joint to cause the annular ridge of the internal joint to press the hose against the conical internal face of the external joint.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
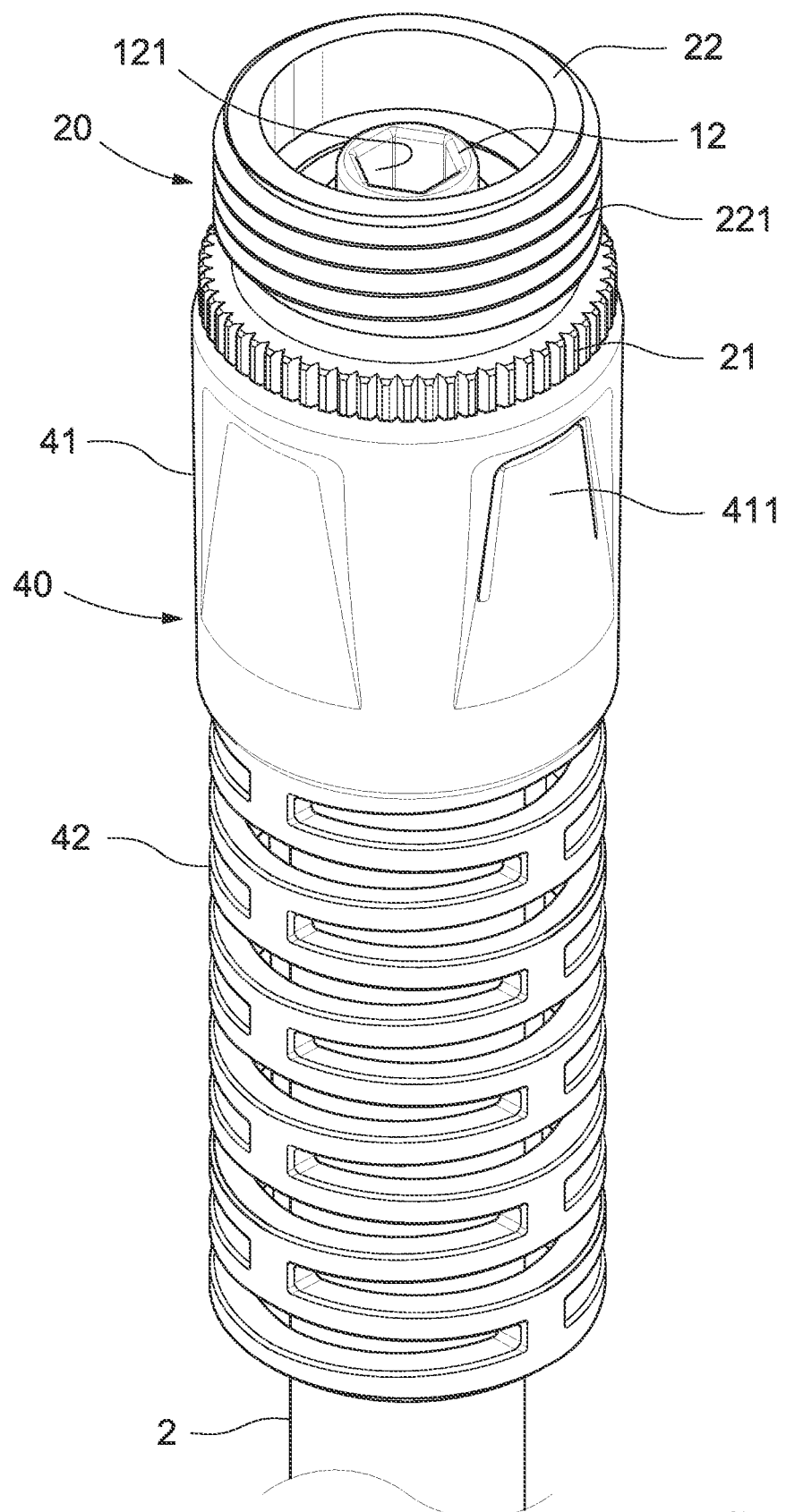
FIG. 1 is a perspective view of a joint assembly according to the first embodiment of the present invention.
Figure 2:
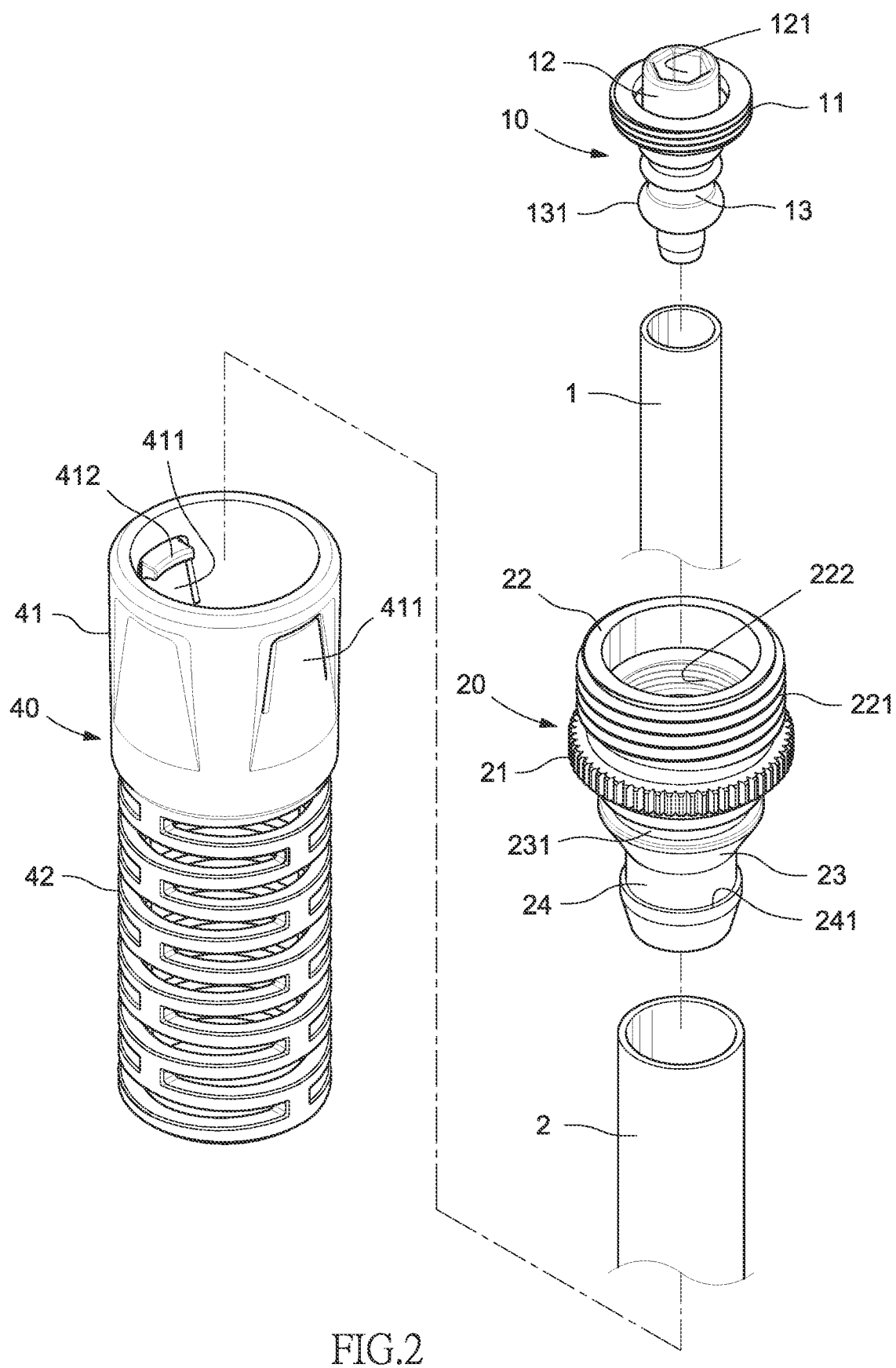
FIG. 2 is an exploded view of the joint assembly shown in FIG. 1.
Figure 3:
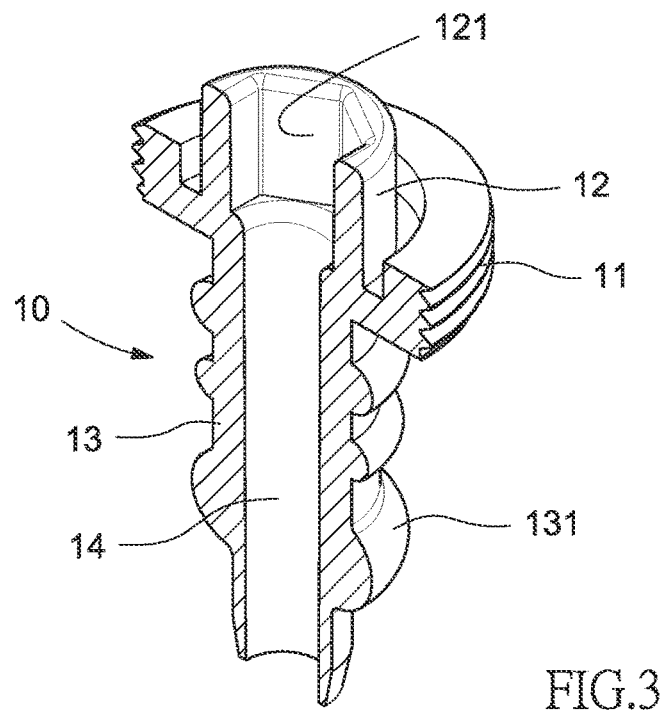
FIG. 3 is a cut-away view of an internal cylinder of the joint assembly shown in FIG. 1.
Figure 4:
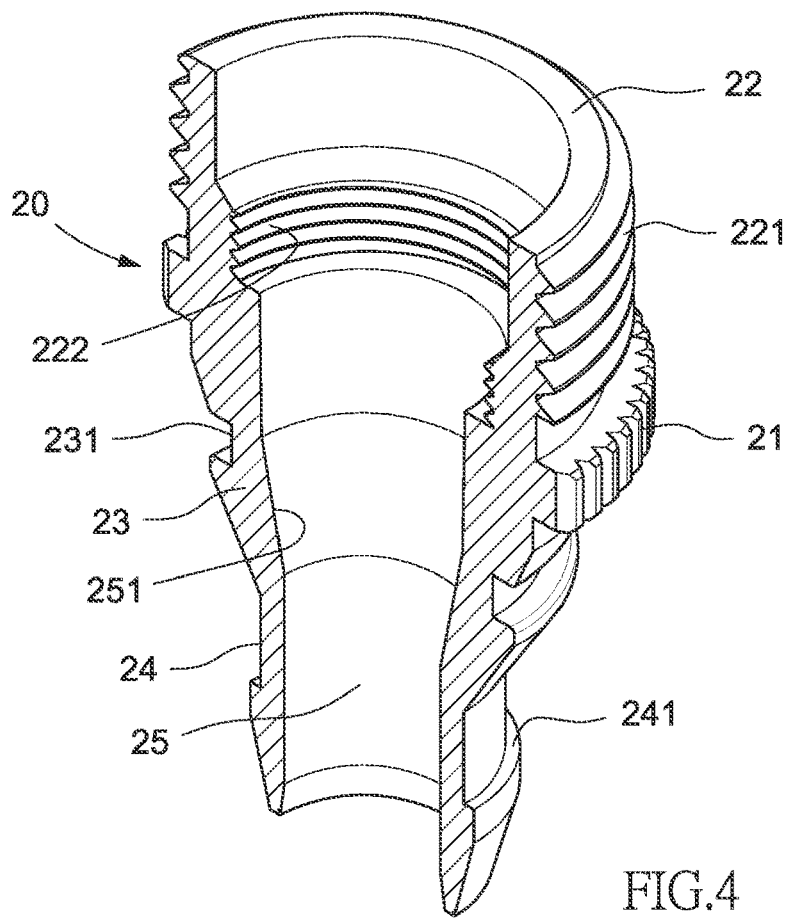
FIG. 4 is a cut-away view of an external cylinder of the joint assembly shown in FIG. 1.
Figure 5:
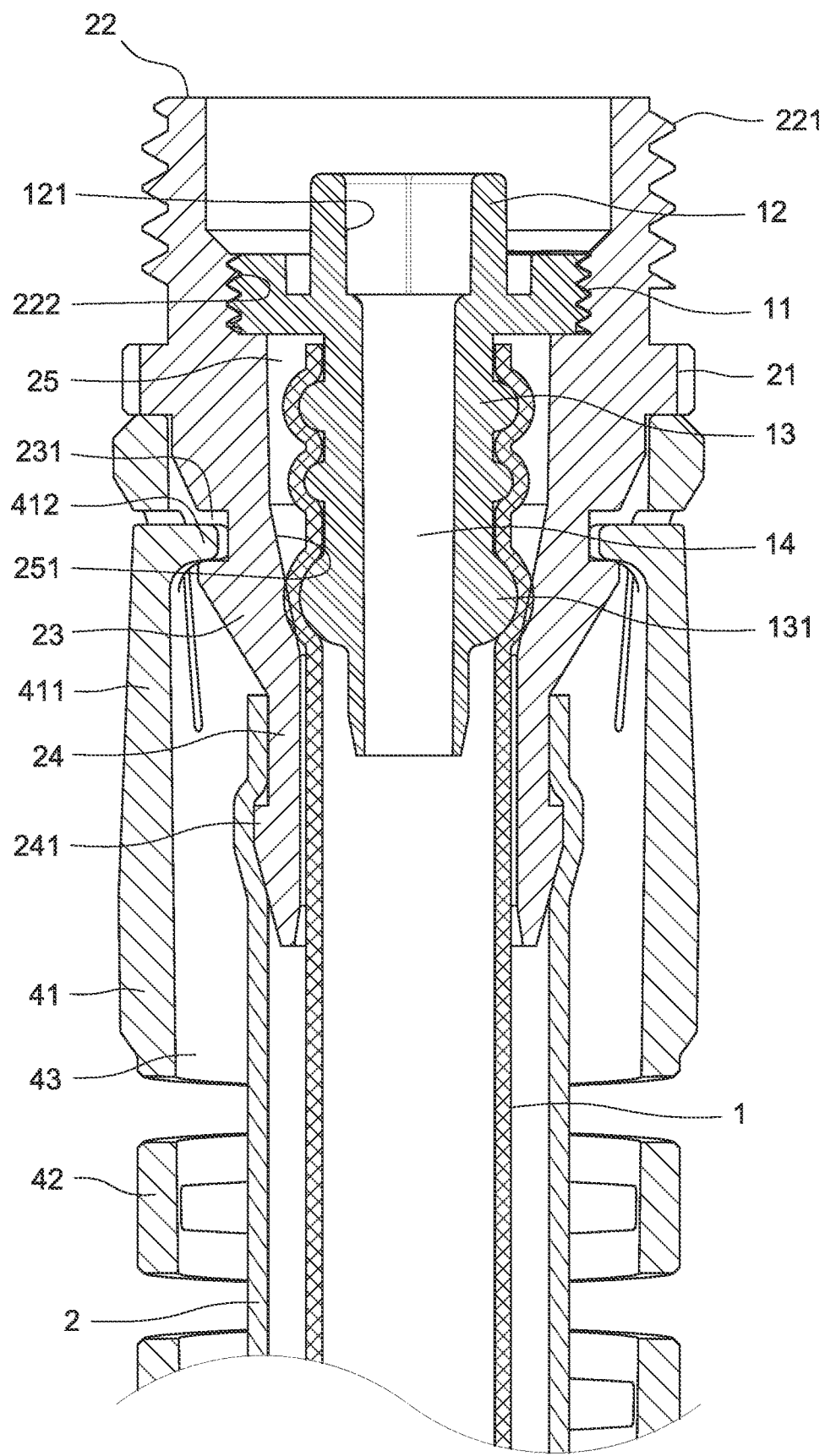
FIG. 5 is a cross-sectional view of the joint assembly shown in FIG. 1.

Referring to FIGS. 1 through 5, a joint assembly includes an internal joint 10, an external joint 20, and a sheath 40 according to a first embodiment of the present invention. In use, the joint assembly is connected to hose assembly that includes a hose 1 in a sleeve 2.

The internal joint 10 includes an external thread 11, a receptacle 12 at an end, and a shank 13 at another end. The receptacle 12 includes a polygonal bore 121. The shank 13 is formed with an annular ridge 131 or more. A channel 14 extends throughout the internal joint 10.

The external joint 20 includes a connective portion 22, a conical portion 23, a shank 24 along its length. A wheel 21 is formed on the connective portion 22. The connective portion 22 is formed with an external thread 221 and an internal thread 222. There is an annular groove 231 between the conical portion 23 and the connective portion 22. The conical portion 23 is tapered toward the shank 24 from the connective portion 22. The shank 24 is formed with an annular shoulder 241. An axial tunnel 25 extends throughout the external joint 20. The external joint 20 includes a conical internal face 251 that is a part of the wall of the axial tunnel 25.

The sheath 40 includes a connective section 41 and a protective section 42 along its length. The connective section 41 is formed with two elastic hooks 411. Each of the elastic hooks 411 is formed with a barb 412. An axial space 43 extends throughout the sheath 40.

In use, the sheath 40 receives the sleeve 2. The axial tunnel 25 of the external joint 20 receives a terminal section of the hose 1 before the shank 13 of the internal joint 10 is inserted in the terminal section of the hose 1. The annular ridge 131 keeps the shank 13 in the hose 1.

A polygonal section of a tool such as an Allen key (not shown) is inserted in the polygonal bore 121 of the receptacle 12. The tool is used to rotate the internal joint 10 to engage the external thread 11 with the internal thread 222. Alternatively, the internal joint 10 can be rotated relative to the external joint 20 with a bare hand. The annular ridge 131 of the internal joint 10 presses the terminal section of the hose 1 firmly against the conical internal face 251 of the external joint 20. Thus, the terminal section of the hose 1 is sandwiched by, and between the internal joint 10 and the external joint 20.

The shank 24 of the external joint 20 is inserted in a terminal section of the sleeve 2. The annular shoulder 241 of the shank 24 keeps the shank 24 in the terminal section of the sleeve 2.

The sheath 40 is moved toward the external joint 20 to insert the barbs 412 of the elastic hooks 411 in the annular groove 231 of the conical portion 23. The sheath 40 prevents the connection of the sleeve 2 to the shank 24 from bending.

The external thread 221 can be engaged with an internal thread of a sprinkler (not shown). Thus, the sprinkler is connected to the hose assembly by the joint assembly. The external thread 221 can be engaged with an internal thread of a collar connected to a faucet (not shown). Thus, the faucet is connected to the hose assembly by the joint assembly. The wheel 21 is formed with an anti-skid periphery to facilitate maneuvering of the wheel 21 to rotate the external joint 20 to engage the external thread 221 with the internal thread of the sprinkler or collar. The anti-skid periphery of the wheel 21 is a toothed periphery for example.

Figure 6:
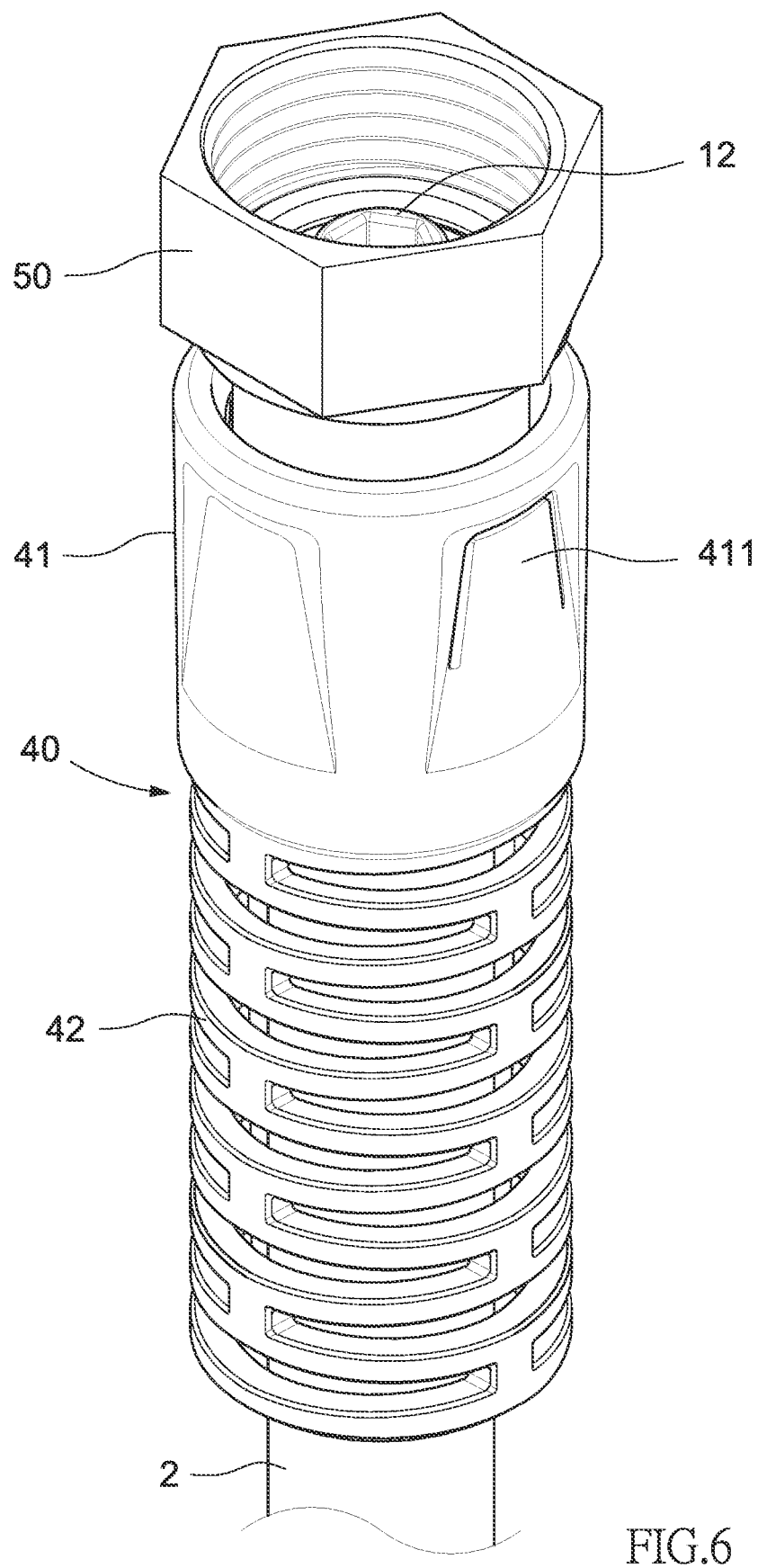
FIG. 6 is a perspective view of a joint assembly according to the second embodiment of the present invention.
Figure 7:
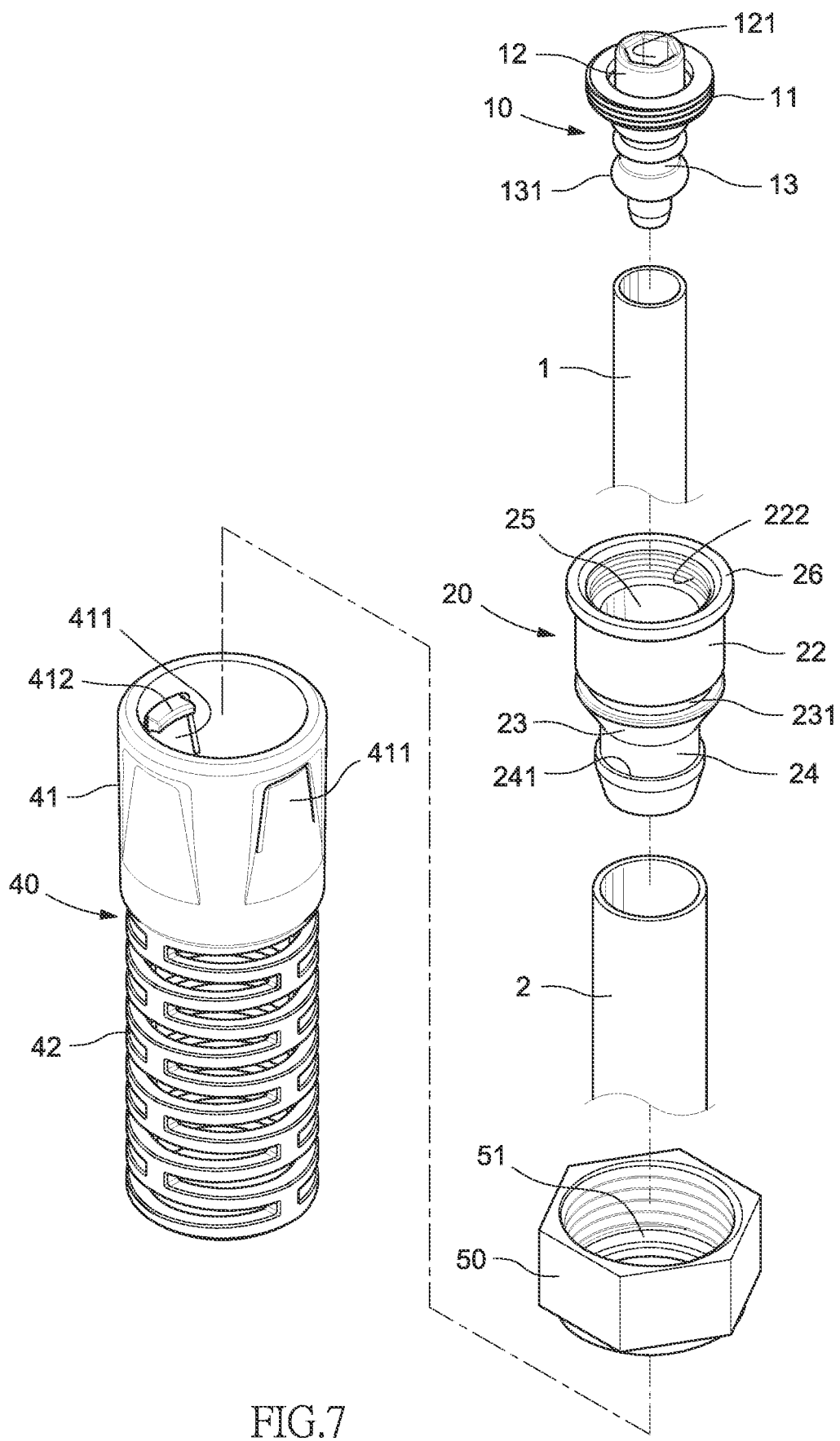
FIG. 7 is an exploded view of the joint assembly shown in FIG. 6.
Figure 8:
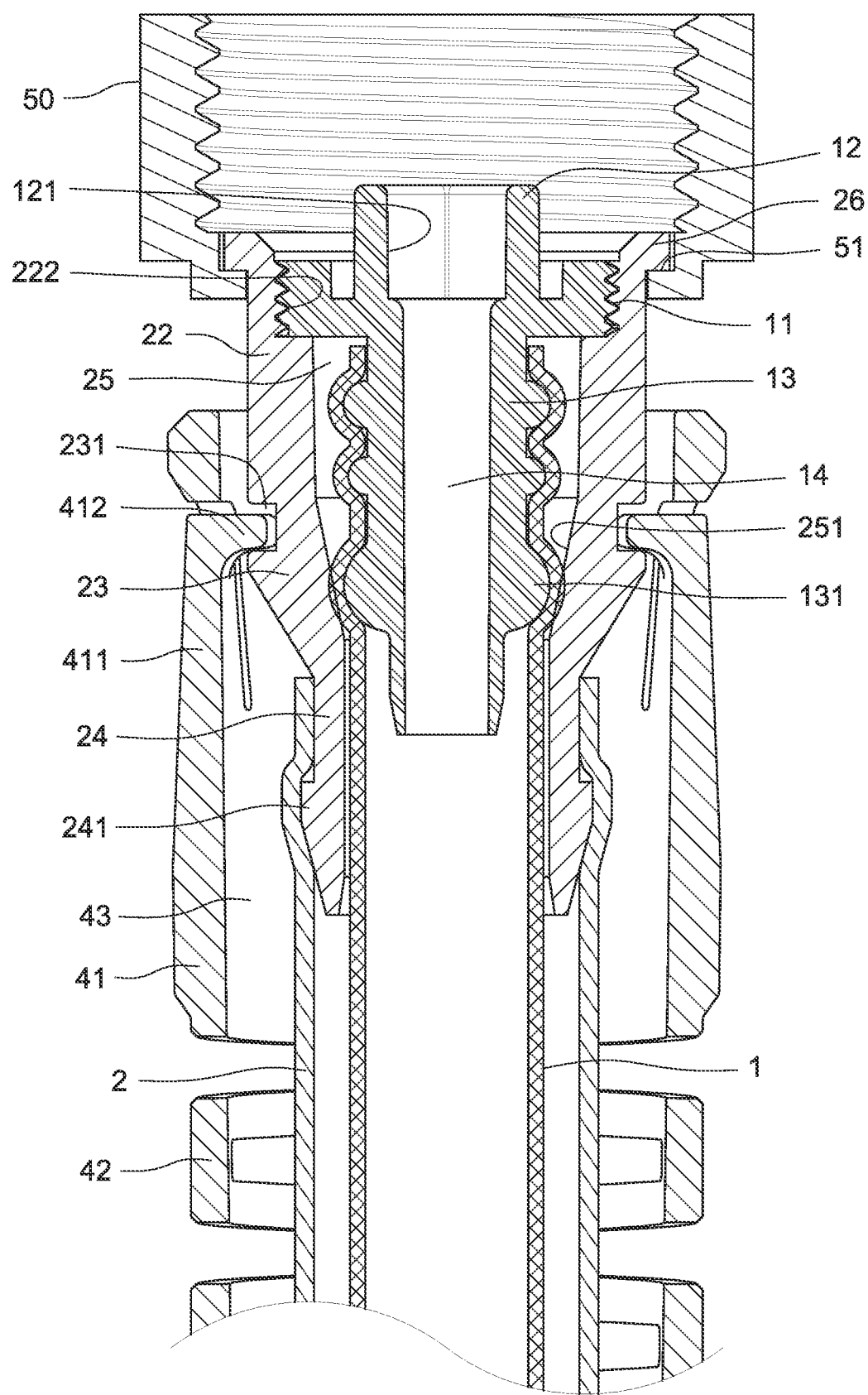
FIG. 8 is a cross-sectional view of the joint assembly shown in FIG. 6.

Referring to FIGS. 6 through 8, there is shown a joint assembly according to a second embodiment of the present invention. The second embodiment is like the first embodiment of the present invention except for two things. Firstly, there is used an additional nut 50 that is formed with a cavity 51. Secondly, the connective portion 22 of the external joint 20 includes a flange 26 instead of the wheel 21 and the external thread 221. The flange 26 is configured in compliance with the cavity 51 of the nut 50.

In use, the connective portion 22 of the external joint 20 extends through the nut 50, allowing the nut 50 to spin relative to the external joint 20. The flange 26 is inserted in the cavity 51 to place the flange 26 on an annular internal portion (not numbered) of the nut 50.

An internal thread of the nut 50 can be engaged with an external thread of a sprinkler (not shown). Thus, the sprinkler is connected to the hose assembly by the joint assembly. The internal thread of the nut 50 can be engaged with an external thread of a collar connected to a faucet (not shown). Thus, the faucet is connected to the hose assembly by the joint assembly.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A joint assembly connected to a hose assembly, wherein the hose assembly comprises a hose inserted in a sleeve, wherein the joint assembly comprises:
   an internal joint comprising an external thread, a shank at an end, and an annular ridge on the shank;
   an external joint comprising an internal thread, a connective portion at an end, a shank at another end, and a conical internal face;
   wherein the shank o the external joint is inserted in the sleeve, wherein the external joint receives the hose, wherein the shank of the internal joint is inserted in the hose, and wherein the external thread of the internal joint is engaged with the internal thread of the external joint to cause the annular ridge of the internal joint to press the hose against the conical internal face of the external joint.

2. The joint assembly according to claim 1, wherein the internal joint further comprises a receptacle at another end configured to receive a polygonal section of a tool for rotating the internal joint relative to the external joint.

3. The joint assembly according to claim 2, wherein the receptacle comprises a polygonal bore.

4. The joint assembly according to claim 1, wherein the external joint further comprises an external thread on the connective portion.

5. The joint assembly according to claim 4, wherein the external joint further comprises a wheel formed on the connective portion, wherein the external thread of the external joint is configured to be engaged with an internal thread of one of a sprinkler or a collar, and the wheel is configured to facilitate rotation of the external joint relative to the sprinkler or the collar.

6. The joint assembly according to claim 1, further comprising a nut, wherein the connective portion of the external joint comprises a flange in contact with the nut while the connective portion of the external joint extends through the nut.

7. The joint assembly according to claim 1, further comprising a sheath connected to the external joint.

8. The joint assembly according to claim 7, wherein the external joint further comprises a conical portion formed on the shank of the external joint, wherein the sleeve comprises two elastic hooks for hooking the conical portion of the external joint, thereby keeping the sheath on the external joint.

9. The joint assembly according to claim 8, wherein the external joint comprises an annular groove between the connective portion and the conical portion, and wherein each of the elastic hooks comprises a barb inserted in the annular groove.

* * * * *